Nov. 20, 1962 W. A. WILLIAMSON 3,064,746

TOW TRACTOR

Filed April 14, 1958 3 Sheets-Sheet 1

INVENTOR.
WILLIAM A. WILLIAMSON
BY J. C. Wiessler
ATTY.

TOW TRACTOR
Filed April 14, 1958 3 Sheets-Sheet 2
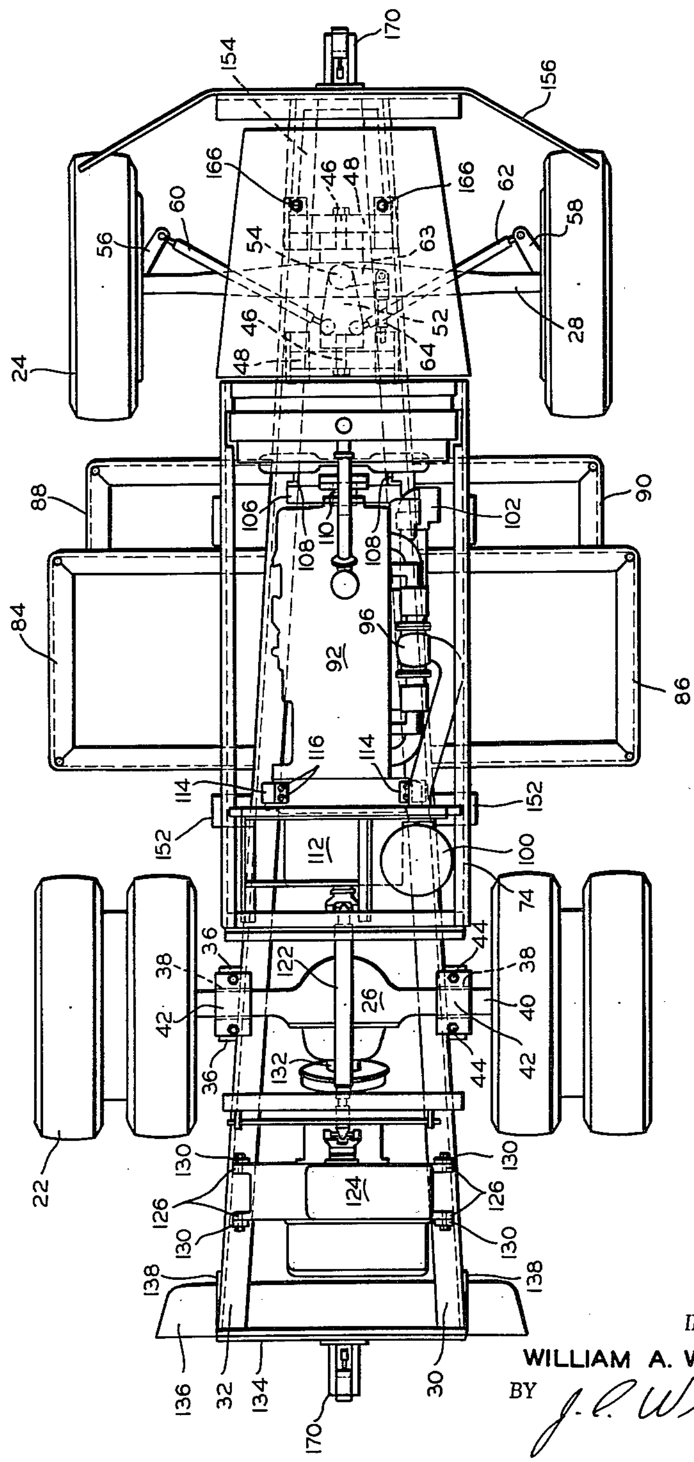
INVENTOR.
WILLIAM A. WILLIAMSON
BY J. C. Wiessler
ATTY.

Nov. 20, 1962 W. A. WILLIAMSON 3,064,746
TOW TRACTOR
Filed April 14, 1958 3 Sheets-Sheet 3
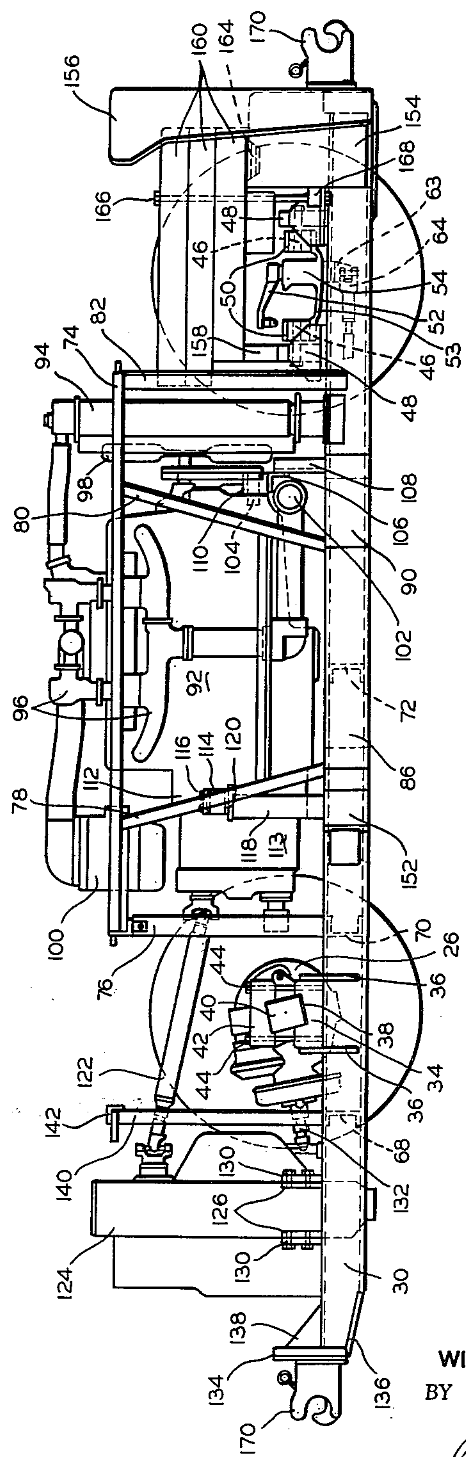
INVENTOR.
WILLIAM A. WILLIAMSON
BY J. C. Wiessler
ATTY.

3,064,746
TOW TRACTOR

William A. Williamson, Battle Creek, Mich., assignor to Clark Equipment Company, a corporation of Michigan Filed Apr. 14, 1958, Ser. No. 728,244
5 Claims. (Cl. 180—54)

This invention relates to towing tractors and more particularly to underslung towing tractors having a novel chassis construction which enables a body construction of extremely low silhouette to be used in conjunction with a relatively short tractor wheelbase and a short turning radius.

Heretofore towing tractors have generally utilized a frame construction located entirely above the axles, and, due to crossbracing required for strength in the frame, it has been the practice to mount the prime mover above the main rails of the frame. Also, it has been customary to mount the prime mover over the front axle in order to maintain the shortest possible wheelbase. Furthermore it has been customary in the construction of vehicles of the type contemplated to mount the transmission ahead of the rear axle and to locate the operator's station centrally of the truck in a relatively elevated position.

In airplane towing operations at air terminals, for example, it is of great advantage if the towing tractor is extremely low in height so that it may be located very close to the nose wheel of the aircraft, thereby facilitating coupling thereto for towing operations. A short wheelbase, and consequent small turning radius with low tractor height are of paramount advantage in facilitating maneuvering the airplane in a relatively small space.

It is therefore a primary object of this invention to provide a towing tractor in which the overall height and the overall length are both minimized.

It is another important object of this invention to provide a towing tractor which is highly maneuverable and which is of such low overall height as to facilitate a close coupling arrangement with the nose wheels, for example, of large airplanes such as heavy bombers and large transports.

It is another object of the invention to provide a towing tractor of relatively low height and short turning radius.

It is a further object of this invention to generally improve upon the chassis and body construction of vehicles of the general type contemplated.

In carrying out my invention, other objects and advantages of which will appear to persons skilled in the art as the description thereof proceeds, I have utilized a chassis construction in which the main frame rails converge toward the steering end of the tractor and are located below the front and rear axles, and in which the power transmission unit and prime mover are located on opposite sides of the drive axle, the prime mover means being located generally centrally of the vehicle and intermediate the axles. With this general constructional arrangement I am able to achieve both a low overall height, a relatively short wheelbase and a relatively short turning radius, which combination of features has heretofore been generally considered incompatible. For example, if my underslung frame construction had been utilized without changing the usual location of the transmission, it would have been necessary to increase the wheelbase very substantially in order to lower the position of the prime mover to take advantage of the underslung frame construction and achieve a vehicle of low overall height. By utilizing converging frame rails I am able to achieve a low silhouette tractor having an extremely short turning radius.

An incidental advantage inherent in my invention lies in the use of the underslung frame principle to achieve a relatively low center of gravity, which results in much improved tractive effort.

Referring now to the drawings:

FIGURE 4 is a plan view of the chassis of the vehicle shown in the foregoing figures; and FIGURE 5 is a side view of FIGURE 4.

Figure 1:
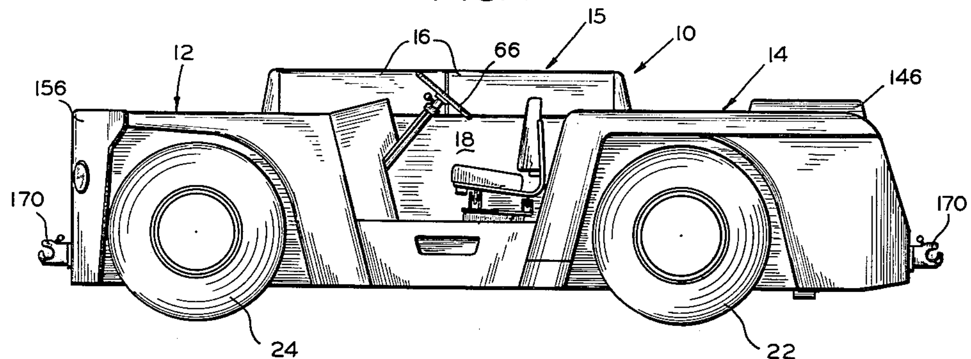
FIGURE 1 is a side elevational view of a tow tractor which utilizes my invention.
Figure 2:
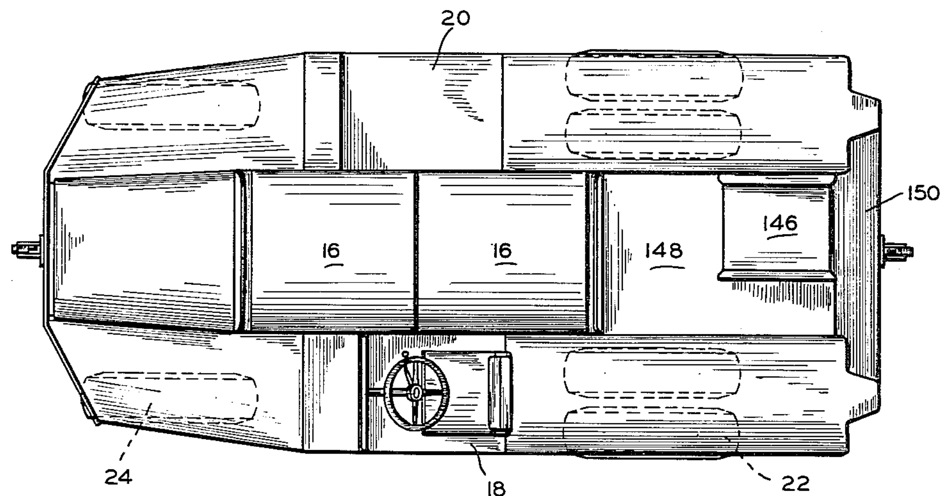
FIGURE 2 is a plan view of FIGURE 1.
Figure 3:
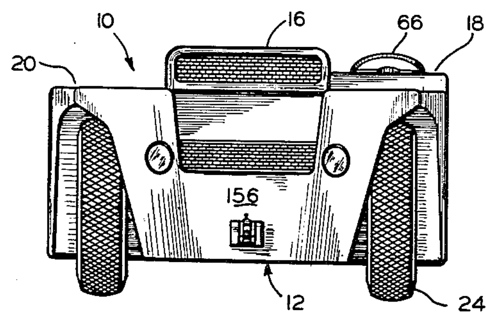
FIGURE 3 is a front elevational view of FIGURE 1.

Referring now in detail to the drawings, the towing tractor of my invention is illustrated generally by the numeral 10 and comprises a body construction as shown in FIGURES 1, 2 and 3, including a forward portion 12, a rearward portion 14, and an intermediate portion 15. The portion 15 comprises generally a centrally located longitudinally extending low-height engine cover 16, an operator's station 18, and a station 20 located transversely of operator's station 18 on the opposite side of engine compartment 16 and of similar configuration to the station 18. Pairs of wheels, viz., drive wheels 22 and steer wheels 24, are located adjacent the vehicle for supporting, along with drive and steer axles, the afore described body construction, and the frame and power train construction to be described.

The chassis, in addition to the pairs of wheels, includes a drive axle 26 connecting the wheels 22, a steer axle 28 connecting the wheels 24, and longitudinal main frame rail members 30 and 32 each of which comprises an inwardly facing channel member which is connected between the axles in non-parallel relation to the other frame rail so that the two frame rails extend in forwardly converging relation.

A drive axle mounting block 34 is secured, as by welding, to the upper leg of each frame rail, and is secured to the base thereof by a pair of plate members 36. Formed in the upper surface of each mounting block 34 is an asymmetric groove 38 which is adapted to receive in rearwardly tilted relation to the vehicle one of the square or rectangular housing arm sections 40, as best shown in FIGURE 5. The entire drive axle unit 26 is held rigidly in the aforementioned position by a pair of upper mounting blocks 42 which are secured to the lower mounting blocks 34 by pairs of bolts 44; each upper block 42 includes an asymmetric groove in the lower surface thereof which complements grooves 38 so that the upper tilted portion of the axle housing arms are received therein.

The steering axle 28 is mounted, by means of a pair of axially aligned and longitudinally spaced trunnion pins 46 which are secured at their one ends to a pair of longitudinally spaced and transversely extending trunnion mounting blocks 48, for articulation in a vertical plane. Blocks 48 extend above and are secured at opposite ends to the upper legs of the pair of frame rails 30 and 32. Extending upwardly of opposite sides of the central portion of the steering axle are a pair of mounting blocks 50 having axially aligned bearings formed therein for receiving the trunnion pins 46. The one mounting block 50 is connected by a web member 53 to the housing 54 of a vertical axle pivot shaft, which is mounted for rotation in a horizontal plane. The upper portion of the spider 52 is pivotally connected to steering arms 56 and 58 (FIGURE 4) of the wheels 24 in a well known manner by tie rods 60 and 62. A steering link lever 63 is connected below the axle 28 to steering pivot 54 and extends transversely thereof to a clevis connection with a rearwardly extending steering link 64. As will be apparent to persons familiar with the art, fore or aft movement of link 64 effects rotation of steering pin 54 and spider 52, and consequent steering movement of wheels 24 through tie rods 60, 62 and steering arms 56, 58. Movement of the steer link 64 is preferably controlled from an operator's steering wheel 66 and through a hydraulic power boost system, not shown. The steering system, as such, forms no part of the present invention, and therefore has not been illustrated in detail.

A plurality of transversely extending channel shaped frame support members 68, 70 and 72 extend between and are rigidly connected at opposite ends thereof to main frame rails 30 and 32. Extending longitudinally of the central portion 15 of the vehicle is an engine compartment and body plate mounting frame which generally comprises an elevated rectangular construction 74 supported from the main frame rails by a plurality of pairs of upwardly extending members 76, 78, 80 and 82. The engine hood section 16 of the vehicle body is suitably secured along the lower marginal edge thereof to the upper surface of the rectangular frame 74.

Cantilevered outwardly from opposite sides of the main frame rails and forming a part of the main frame are pairs of generally rectangular frame assemblies 84, 86, 88 and 90. The body section forming operator's compartment 18 is formed of body members connected to transversely extending frame assembly 84 and to upwardly extending members 78 and 80, and the compartment 20 is similarly formed upon frame assembly 86 and members 78 and 80 on the opposite side of the vehicle.

An internal combustion engine is illustrated generally at numeral 92 and has associated therewith the usual accessories, including a radiator 94, manifold and carburetor assembly 96, a fan 98, an air filter 100, and exhaust section 102, and other components, not shown, for operating the engine. A forwardly extending centrally mounted trunnion pin 104 is secured to the forward end of the engine for mounting same upon a transversely extending angle mounting bracket 106 which is secured at the opposite ends thereof to the main frame rails by a pair of vertically extending bracket members 108. The trunnion pin 104 extends into an opening forming a bearing surface in a trunnion mounting member 110 which is secured centrally of bracket 106. The engine bell housing 112 is connected to a torque converter 113 and has formed on each side thereof a transversely extending mounting boss 114. Each of the bosses 114 is resiliently mounted by a pair of bolts 116 to an upwardly extending post 118, a resilient pad 120 being interposed between each boss 114 and the post 118 so that the engine 92 may rotate slightly relative to the frame about trunnion pin 104 within the limits of resiliency of the pads 120.

It is important to note that the underslung frame construction above described in combination with the engine mounting means affords an opportunity to mount the engine at an extremely low elevation relative to the axles, the engine being located intermediate the drive and steer axles with the entire lower longitudinal portion thereof being located generally in the horizontal plane of the axles.

The transmission unit 124 is mounted rearwardly of the drive axle generally in the horizontal plane of the engine, and is drivably connected to the engine by means of a rearwardly and upwardly extending drive shaft 122. Transversely extending bosses 126 are formed on opposite sides of the transmission in the lower portion thereof and are adapted to be rigidly connected with a pair of longitudinally spaced and upwardly extending posts 130 which are secured at their lower ends, as by welding, to the upper legs of each frame rail 30 and 32. A downwardly and rearwardly extending drive shaft 132 connects the lower portion of the transmission with the tilted drive axle 26.

A transverse rear fender support assembly comprising a vertically extending plate member 134, a longitudinally extending plate 136 and a pair of gusset plates 138 is secured, as shown to the rear extremity of frame rails 30 and 32, the outwardly extending ends of plate 136 and the upper edge of plate 134 being adapted to be secured to the after ends of the fenders of rear body portion 14 thereto. A pair of upwardly extending posts 140, which are secured to the upper legs of frame rails 30 and 32 intermediate the transmission and drive axle units, are connected at the upper ends thereof by an angle member 142; the posts 140 and member 142 together with the posts 76 and plate 134 are adapted to have connected thereto the main body plates of rear body portion 14, including a slightly raised transmission cover plate assembly 146 and cover plates 148 and 150. The forwardmost ends of the rear fenders are supported upon a pair of transversely spaced and outwardly extending blocks 152, which are secured to the base portions of frame rails 30 and 32.

Mounted transversely of the forward extremities of the frame rails and secured thereto by bolts 166 is a generally U-shaped upwardly extending plate 154. A transversely extending body and frame member 156 of forward body portion 12 is secured to the forward ends of the frame rails. Mounted between the upper edges of the legs of U-shaped member 154 and a transversely extending block 158, which is secured to the transverse portion of rear trunnion mounting block 48, are a plurality of vertically stacked solid metal plates 160. Chamfered block members 164 are mounted in recesses formed in the upper edges of the legs of U-shaped plate 154 for restraining the plates 160 from shifting position, said plates being also secured in position by means of the pair of laterally spaced bolts 166 which extend downwardly through laterally spaced ears 168; the ears 168 project rearwardly from and form part of the rearward edges of the legs of U-shaped plate member 154. The plates 160 function as traction weights for preventing slippage of the front wheels during operation of the vehicle as a pusher type tractor. The front fenders are supported at the rear ends thereof upon the transversely extending frame assemblies 88 and 90 and at the front ends thereof on opposite sides of the front plate member 156.

A coupling assembly 170 is securely connected to each of the opposite ends of the chassis so that the vehicle 10 is capable of being coupled at either end thereof to a load to be towed or pushed.

It will be understood that by utilizing converging frame rails 30 and 32 sufficient room is provided between the rear end portion of the frame rails so that the transmission 124 can be supported in a relatively low position wherein the lower portion of the transmission extends into the space between said rails. At the same time, close convergence of the rails adjacent the steering axle 28 permits the steering axle to oscillate about trunnion pins 46 through a considerably larger angle than would be the case if the frame rails did not converge from the lateral spacing thereof in the area of the transmission. Also, the converging frame rails permit the dirigible wheels 24 to be actuated through a greater steering angle to shorten the turning radius of the tractor than would be the case if the frame rails did not converge.

From the foregoing it will be appreciated that I have combined in an extremely unique manner a plurality of constructional features and power train components which together provide a compact vehicle chassis construction of relatively low height and short wheelbase and turning radius, which combination of features is of great advantage in certain classes of vehicles, such as above described.

Although only a single embodiment of the invention has been shown and described herein, it will be apparent to persons skilled in the art that numerous modifications in the construction and arrangement of parts may be made without departing from the scope of the invention.

I claim:

1. A tow tractor of relatively low overall height for towing aircraft and the like having an underslung frame in combination with a relatively short wheelbase whereby to effect a relatively short turning radius comprising a pair of longitudinally spaced wheeled axles, one of which axles is a drive axle and the other of which axles is a steer axle having dirigible wheels at opposite ends thereof, a pair of laterally spaced and longitudinally extending main frame rails supported from said axles in a plane beneath said axles, said frame rails extending in converging relation from the drive axle end to the steer axle end of the tractor, prime mover means supported by said frame rails in longitudinally spaced relation to said drive axle, a cantilevered framework supported by at least one of the frame rails in a location transversely outwardly of said prime mover means, said framework supporting an operator station at the one side of the tractor, common tractor body means enclosing said prime mover means and forming one side portion of said operator station, and pivot means mounting said steer axle for oscillation in a vertical plane, said converging frame rails permitting a relatively large angle of steer axle oscillation and a relatively large steer angle of the dirigible wheels.

2. A tow tractor of relatively low overall height for towing aircraft and the like having an underslung frame in combination with a relatively short wheelbase whereby to effect a relatively short turning radius comprising a pair of longitudinally spaced wheeled axles, one of which axles is a drive axle and the other of which axles is a steer axle, a pair of laterally spaced and longitudinally extending main frame rails supported from said axles in a plane beneath said axles, said frame rails extending in converging relation from the drive axle end to the steer axle end of the tractor, vertically extending power transmission means supported by said frame rails at the drive axle end of the tractor, the lower portion of the transmission means extending into the space between the frame rails, longitudinally extending trunnion means mounting the steer axle upon the frame rails and located above the frame rails to permit rotation of the steer axle in a vertical plane about an axis located above the frame rails, and dirigible wheels mounted upon opposite ends of the steer axle, said converging frame rails facilitating both a low-slung mounting position of the transmission means adjacent the drive axle, a relatively short turning radius of the dirigible wheels and a relatively large angle of oscillation of the steer axle.

3. A tow tractor of relatively low overall height having an underslung frame in combination with a relatively short wheelbase whereby to effect a relatively short turning radius comprising a pair of longitudinally spaced wheeled axles, one of which axles is a drive axle and the other of which axles is a steer axle, a pair of laterally spaced and longitudinally converging main frame rails supported from said axles in a plane beneath said axles, said frame rails extending in converging relation from the drive axle end to the steer axle end of the tractor, prime mover means supported from said frame rails intermediate said axles, power transmission means supported from said frame rails adjacent said drive axle and extending downwardly into the space between said frame rails, a cantilevered framework supported by at least one of the frame rails intermediate said axles and extending laterally outwardly thereof in a location transversely adjacent the prime mover means, said framework supporting an operator station at one side of the tractor, dirigible wheels located at opposite ends of the steer axle and adapted to be actuated in steering movement, and pivot means mounting said steer axle for oscillation in a vertical plane, both the angle of steering axle oscillation and the steering angle of the dirigible wheels tending to be maximized as a result of the converging relation of the frame rails at the steering axle end of the tractor.

4. A tractor as claimed in claim 3 plus counterweight means supported from said frame rails above and over said steer axle for preventing slippage of the dirigible wheels during operation of the tractor as a pusher type vehicle.

5. A tow tractor of relatively low over-all height for towing aircraft and the like having an underslung frame in combination with a relatively short wheel base whereby to effect a relatively short turning radius comprising a pair of longitudinally spaced wheeled axles, one of which axles is a drive axle and the other of which axles is a steer axle having dirigible wheels at opposite ends thereof, a pair of laterally spaced and longitudinally extending main frame rails supported from said axles in a plane beneath the axes of said axles, said frame rails extending in converging relation from the drive axle end to the steer axle end of the tractor, prime mover means supported by said frame rails intermediate said axles, transmission means supported by said frame rails on the side opposite the drive axle to that on which the prime mover means is supported, said transmission means being located on said frame rails in a location wherein the frame rails approach maximum lateral spacing, a first drive shaft connecting said prime mover to the transmission means and extending upwardly and rearwardly from the mover to the upper portion of the transmission means, a second drive shaft connecting the transmission means to the drive axle and extending upwardly and forwardly from the lower portion of the transmission means to the drive axle, a cantilevered framework supported by at least one of the frame rails in a location transversely outwardly of said prime mover means, said framework supporting an operators's station at the one side of the tractor, and pivot means mounting said steer axle for oscillation in a vertical plane, said converging frame rails permitting a relatively large angle of steer axle oscillation and a relatively large steer angle of the dirigible wheels.

References Cited in the file of this patent

UNITED STATES PATENTS

| | | |
|---|---|---|
| 1,942,181 | Maurer et al. | Jan. 2, 1934 |
| 1,972,224 | Herman | Sept. 4, 1934 |
| 1,991,577 | Remde | Feb. 19, 1935 |
| 2,090,721 | Best | Aug. 24, 1937 |
| 2,091,652 | Porsche | Aug. 31, 1937 |
| 2,095,344 | Nelson | Oct. 12, 1937 |
| 2,199,517 | Best | May 7, 1940 |
| 2,409,552 | Donnellan | Oct. 15, 1946 |
| 2,448,172 | Couse | Aug. 31, 1948 |
| 2,602,518 | Beck | July 8, 1952 |
| 2,694,460 | Lehmann | Nov. 16, 1954 |
| 2,727,639 | Ball et al. | Dec. 20, 1955 |